United States Patent [19]

Dumbeck

[11] 4,324,947

[45] Apr. 13, 1982

[54] SOLAR ENERGY COLLECTOR SYSTEM

[76] Inventor: Robert F. Dumbeck, P.O. Box 548, Elgin, Tex. 78621

[21] Appl. No.: 199,591

[22] Filed: Oct. 22, 1980

Related U.S. Application Data

[63] Continuation-in-part of Ser. No. 39,551, May 16, 1979, Pat. No. 4,275,711.

[51] Int. Cl.³ .......................... F24J 3/02; H01L 31/00
[52] U.S. Cl. .................................. 136/248; 126/418; 126/424; 126/438
[58] Field of Search ............... 126/418, 424, 425, 438; 353/3; 250/203 R; 350/288, 289, 292; 136/246, 248

[56] References Cited

U.S. PATENT DOCUMENTS

| | | | |
|---|---|---|---|
| 4,172,442 | 10/1979 | Boblitz | 126/422 |
| 4,217,147 | 8/1980 | Ziemba | 136/248 |
| 4,223,214 | 9/1980 | Dorian et al. | 250/203 R |
| 4,266,530 | 5/1981 | Steadman | 126/424 |

FOREIGN PATENT DOCUMENTS

| | | | |
|---|---|---|---|
| 2523479 | 12/1976 | Fed. Rep. of Germany | 136/248 |
| 2558767 | 7/1977 | Fed. Rep. of Germany | 126/425 |
| 2824494 | 2/1980 | Fed. Rep. of Germany | 126/424 |

*Primary Examiner*—Aaron Weisstuch
*Attorney, Agent, or Firm*—Laurence R. Brown

[57] ABSTRACT

Simple flat plate reflectors, preferably compound of a panel with a reflector surface layer laminated thereto, are pivoted to move with the position of the sun and concentrate additional energy on a solar energy collector panel. The array can take a tented or triangular end view shape for closing to protect reflective surfaces from hail or sandstorm, etc. Also the surfaces are provided with a periodically operable surface cleaner to assure long term efficiency even when remotely positioned as on roof top.

Low cost present day computers are programmed to track the sun over its seasonal variations by means of simple mechanisms pivoting the reflector plates. The system is self-energizing by means of batteries charged by solar panels accompanying the system.

Solar energy is storable in a self-contained water tank for use at night, etc. and efficient energy conversion is attained by means of a stainless steel pipe length extending into the stored water and thermally coupled outside the tank to a solar heated higher than 100° C. silicon oil circulated through the solar collector. Thus, vaporization is avoided and an effective low-cost simplified thermal energy conversion is effected.

13 Claims, 5 Drawing Figures

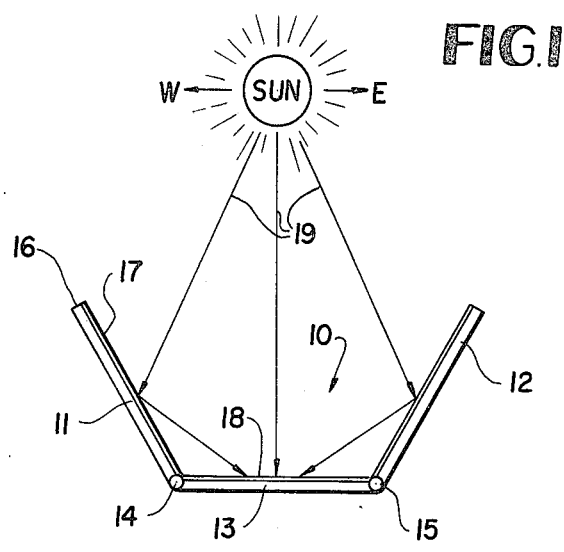
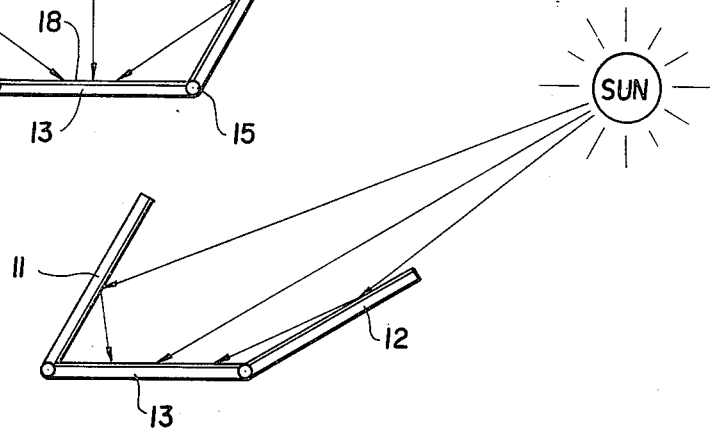
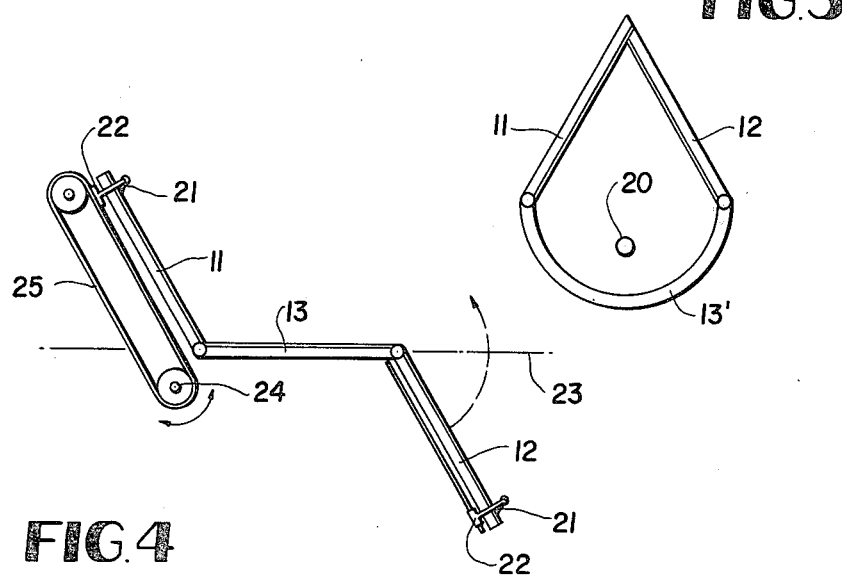

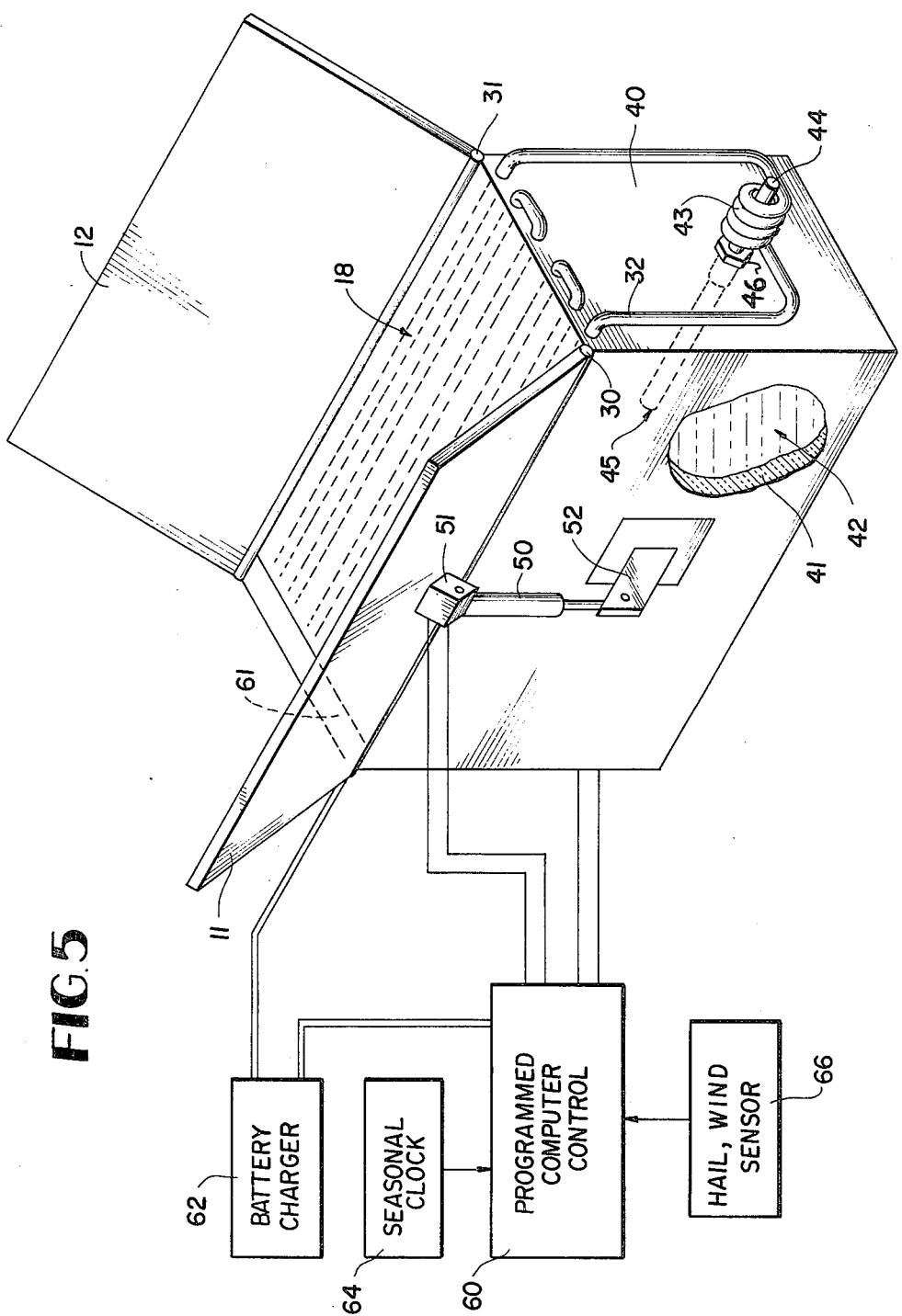

SOLAR ENERGY COLLECTOR SYSTEM

This application is a continuation-in-part of my copending application Ser. No. 039,551 filed May 16, 1979 for SOLAR ENERGY COLLECTOR SYSTEM, now U.S. Pat. No. 4,275,711.

TECHNICAL FIELD

This invention relates to solar energy collection systems and more particularly it relates to systems with programmed reflectors for following the daily path of the sun thereby to intensify the available solar energy.

BACKGROUND ART

Some prior art solar energy collector systems have been expensive since they have required complex lenses and reflectors of parabolic curvature, or the like, which are difficult to construct.

Other deficiencies include the inefficiencies of operation due to accumulated dirt or film on the lenses or reflectors. Particularly in roof top and other inaccessible locations, the surfaces are not easily cleaned.

Also the requirement for accumulation and storage of the solar energy for use at night has involved energy conversion and transfer systems both complex and expensive.

It is accordingly an object of this invention to resolve these prior art deficiencies and provide an improved inexpensive solar energy system.

This is achieved in part by providing flat surfaced reflectors pivotably movable to direct solar energy to collector surfaces as the direction to the sun changes. Such reflectors are in turn incorporated into a self-sufficient system operable as a modular unit for efficiently transferring solar energy into hot water stored energy form and tracking the sun to maximize collection efficiency.

There is no known prior art operable in this manner.

DISCLOSURE OF THE INVENTION

The solar system afforded by this invention is distinguished by low reproduction cost of a system which efficiently receives and stores solar energy over various operating conditions. Thus, for example, the energy is intensified by low cost movable flat plate reflector members pivoted to track the sun's position throughout a day. The flat plate reflector members can be of polished metal, stainless steel, chromium plate or the like, but preferably are a mechanical plate assembly of steel or wood with a reflector surface lamination thereon.

A triangular clam-shell like configuration provides for pivoting of two flat plates about spaced pivot positons in any position from a substantially common plane to a closed triangular position protecting the reflector surface against hail or sand blast damage.

Solar energy is stored efficiently by heating water from a circulating solar superheated oil by means of a heat conductive member preferably in the form of a pipe length extending through the wall of a water storage tank and mounted by a special mandrel coupling for transferring heat from the oil.

The flat plates are moved by a computer controlled mechanism to track the sun over seasonal changes and to divert operation to closure whenever hail, windstorms, etc. threaten to damage the reflector surfaces.

Other features, objectives and advantages of the invention will be found by consideration of the following description, drawings and claims.

BRIEF DESCRIPTION OF THE DRAWINGS

In the drawing:

FIGS. 1 and 2 represent by end view sketches different tracking positions of a flat plate solar reflector-collector array afforded by this invention;

FIG. 3 is a similar end view sketch of a collector array variation in a closed position for protection of the reflector surfaces;

FIG. 4 is an end view sketch showing typical mechanisms for cleaning the reflection surfaces; and FIG. 5 is a schematic system assembly shown in block diagram and perspective form.

DETAILED DESCRIPTION OF THE PREFERRED EMBODIMENT

As may be seen in FIG. 1, this invention provides a solar collector-reflector array 10, which comprises a plurality of flat plate reflectors 11, 12. The flat element 13 may be a solar collector presenting an array of energy conversion elements such as oil filled pipes or solar actuated electrical generator means. The flat reflector plates 11 and 12 are movably pivoted about axes 14, 15 to adapt to various positions (such as shown in FIGS. 1 to 4) by means of a suitable mechanism, such as later described or there may be positioned manually or periodically, as desired.

The reflector plates 11 and 12 can be stainless steel or chromium plate, etc. members but are preferably of a plastic, steel or wood base 16, with a reflection surface 17 laminated thereto. Similarly the collector element 13 may have an energy absorbing surface lamination 18 or equivalent photo electrical panel array or suitable heat collection piping means for deriving energy from the collected solar rays 19.

FIG. 1 is shown in mid-day sun position where it is evident that the reflector panels 11, 12 concentrate more solar energy on collector panel 13 than received directly, and under ideal conditions may increase available energy almost threefold.

FIG. 2 illustrates the function of the pivoted reflector panels 11, 12 in tracking the sun, as shown in early morning position. It is evident that the panels 11, 12 therefore may be pivoted in a pattern that will maximize collected energy by tracking the sun across the sky in its daily morning to evening excursion. Thus, the end view of the panels are shown as longitudinally aligned along a north-south axis into the plane of the drawing, which designates the east-west path of the sun.

FIG. 3 illustrates that the clam-shell like operated panels 11, 12, may be pivoted into a closed triangular configuration to protect the reflective surfaces against damage by hailstone, sandstorm, etc. Also, it illustrates compatibility of the reflector panels 11, 12 with a focusing array with the arched collector panel 13' serving to focus energy on a collector axis 20 along which a pipe may be located to absorb collected solar heat energy.

The efficiency of solar collection is considerably reduced by contamination, dirt, dust, film, etc. on the reflector surfaces 17. Accordingly, the flat plates are cleaned by a movable cleaning pad mechanism configuration such as shown in FIG. 4. Thus, a cleaning pad 21, preferably a silicone wetted sponge array for scanning a reflector surface such as stainless steel, is moved across the reflector surface by means of a carriage 22 that moves along the flat panels 11, 12.

The cleaning pad is swept across the reflecting surface by scheduled periodic mechanical movement or at will by means such as the gravity actuated pad 21 operable on plate 12 when tilted downwardly below the flat plane 23 limitation to movement for reflection purposes. A catch release can hold the pad 21 and carriage 22 at either end.

In the embodiment for panel 11, the pad 21 and carriage is forcefully moved by means of a rotatable pulley or sprocket 24 and belt or chain 25. This can be motor driven as desired by appropriate programming means.

The system arrangement is shown in FIG. 5 and may literally be mounted in a box-like array at a convenient location accessible to the sun such as on the roof. The two reflector panels 11 and 12 pivot about axes 30, 31 in the manner aforesaid to direct reflected solar energy supplementing direct solar rays on the collector panel 18.

Piping 32 is thus exposed to the solar energy and carries silicone oil for circulation in the simplest manner by thermal current flow. Thus, the oil can be heated advantageously considerably hotter than 100° C. without vaporization.

To store the solar energy and convert it for household heating systems or a hot water source, the tank 40 having insulation walls 41 is filled with water 42. Efficient and simplified energy exchange is achieved by wraps 43 of the piping 32 around the outer closed end 44 of a length of pipe 45, preferably stainless steel. This length of pipe 45 extends through an insulated fitting 46 inside the water tank to effectively heat water on both inner and outer surfaces thereby providing a large thermal contact surface area of interchange between the cooler water and hotter circulating oil.

The reflector panels are moved by such means as a motorized or hydraulic jack mechanism 50 pivotally attached at each end by respective brackets 51, 52. The position of the reflector panels 11, 12 can then be programmed to track the sun across the sky by an appropriate computerized program controlling the motorized jack 50.

The computer 60 and motor drive system can be made self-sustaining by means of a solar photoelectric panel section 61 used to charge battery-charger unit 62 with solar energy to supply energy for the computer and motor.

Also the computer 60 is programmed to compensate for seasonal changes in the tracking of the reflective panels 11 and 12 by means of an appropriate seasonal clocking program 64. Further controls for closing the reflectors and protecting the reflector surfaces in the event of windblow, sand, hail, etc., are programmed to respond to the appropriate sensors 66.

It is readily seen therefore that a simple inexpensive self-contained solar energy system can be afforded by this invention.

INDUSTRIAL APPLICATION

There is provided, an inexpensive solar collection-reflector system programmable to track the sun position for maximum energy conversion. A self-contained system can simply heat water to store the solar energy for use as necessary.

I claim:

1. A solar energy collection system comprising in combination two substantially flat pivotably movable energy directing plates with reflector surfaces adapted to change position for maximizing solar ray energy collection therewith, a reservoir tank for heat storage liquid, means mounting said plates on said reservoir; means for heating the liquid in the reservoir with solar energy directed by said plates; and further including tubing means heating a circulating oil medium with solar energy reflected from said plate, and an interchange unit for heating water in said reservoir tank from the circulating oil comprising a heat exchange conductor element, a fitting for extending the element from the exterior into the tank, and a heat exchange fitting coupled to a portion of the element exterior to the tank comprising a wrap of tubings containing the circulating oil.

2. The system defined in claim 1 having means moving a cleaning member comprising a silicone wetted sponge in contact with the flat reflector surfaces.

3. The system as defined in claim 5 including means responsive to conditions that might dirty or damage the plate reflector surfaces for moving the plates into a position protecting the reflection surfaces against damage.

4. The system as defined in claim 1 wherein said two movable plates are pivoted relatively to a common plane to describe movement arcs extending from a relatively flat plane to a triangular configuration.

5. The system of claim 1 wherein the flat plates have a reflector surface layer laminated thereon.

6. The system of claim 1 including a gravity actuated cleaner mechanism movable along the flat plates in contact therewith to clean the reflective surfaces thereof, and means periodically releasing the the cleaner to move across the reflective surfaces by gravity.

7. A solar energy collection system comprising in combination, a solar ray energy collection device with a reflective surface, a solar energy collection device receiving energy reflected from said reflective surface, means passing a circulating oil medium through said collection device to be heated by collected solar energy to substantially above 100° C., a water heat storage tank, a heat exchange member comprising a length of heat conductive pipe affixed to extend into the tank with a portion externally disposed and a portion internally disposed in heat conductive contact with the water, and means circulating the solar heated oil medium into heat conductive contact with the portion of the pipe externally disposed outside the tank.

8. The system of claim 14 wherein the length of heat conductive pipe is mounted through the tank wall by an insulating bushing.

9. A heat exchange system for heating water with solar energy comprising in combination, a reflector array for concentrating solar energy, an oil filled pipe receiving the concentrated solar energy from the reflector array coupled to circulate solar heated oil at temperatures up to in excess of 100° C., a water tank, an elongated heat conductive element having a fitting for holding it in a wall of the water tank and extending the element into heat conductive contact with water in the tank, and means providing heat conductive contact of said oil filled pipe with a portion of the heat conductive element extending outside the tank.

10. The system of claim 9 wherein the heat conductive element is a length of heat conductive pipe presenting inside the tank a heat exchange surface for water exposure both outside and inside the pipe.

11. The system of claim 10 wherein the heat conductive pipe length is mounted by a heat insulated screw type pipe clamp fitting encompassing the pipe near its exterior end to extend both internally into and externally from the water tank.

12. The system of claim 9 including means moving said array to track the sun for intensifying collected solar energy throughout the day as the relative position of the sun changes.

13. The system of claim 12 wherein said moving means is operable from a battery and a solar photo-electric panel receiving energy from said reflector system for charging the battery.

* * * * *